United States Patent Office 3,446,322
Patented May 27, 1969

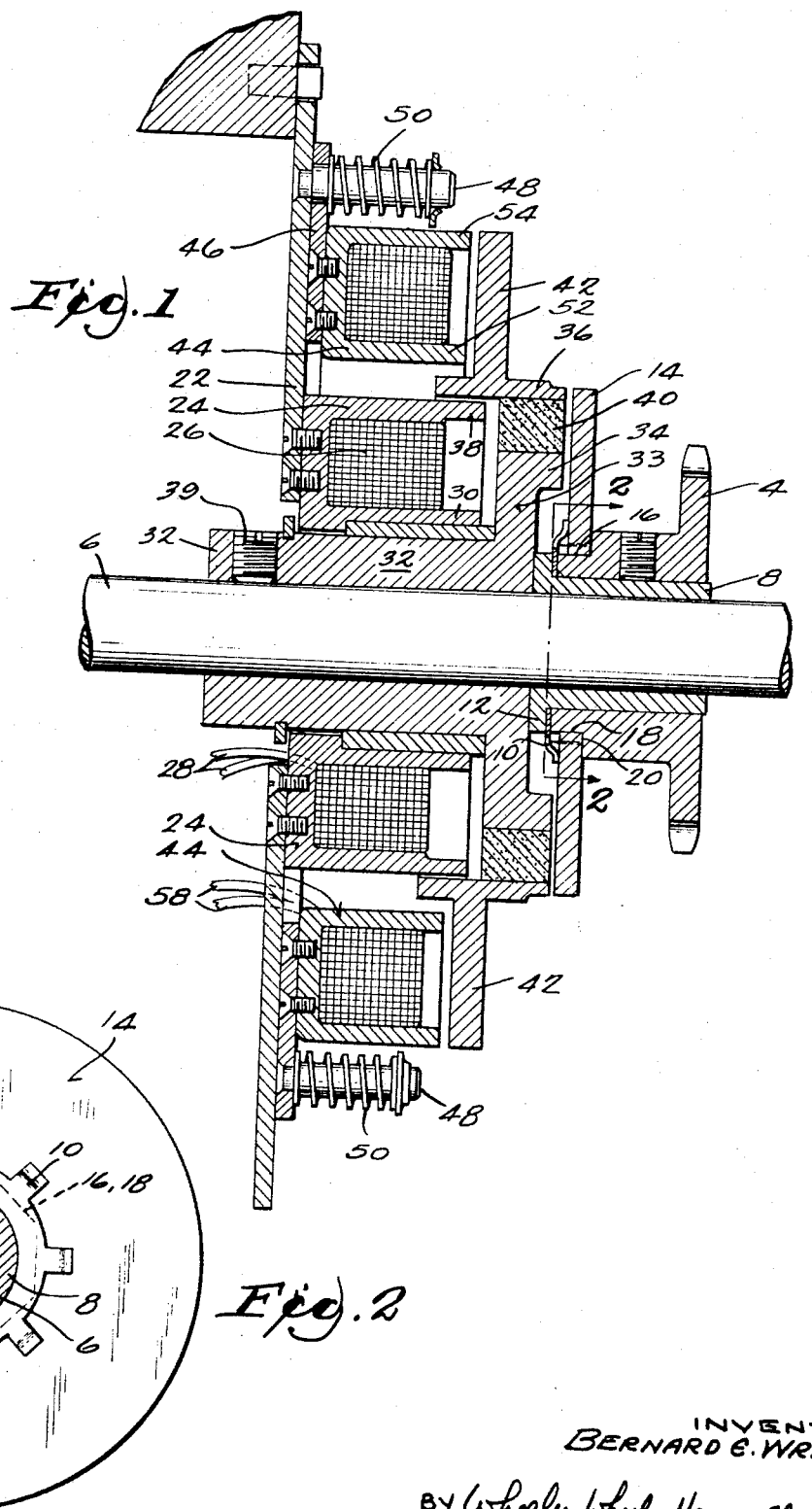

3,446,322
ELECTROMAGNETIC CLUTCH WITH AUXILIARY CLUTCH OR BRAKE INDEPENDENTLY ENERGIZED
Bernard E. Wrensch, Brookfield, Wis., assignor to Stearns Electric Corporation, Milwaukee, Wis., a corporation of Wisconsin
Filed Sept. 12, 1967, Ser. No. 667,206
Int. Cl. F16d *11/06, 13/22, 67/02*
U.S. Cl. 192—18                                    6 Claims

ABSTRACT OF THE DISCLOSURE

Axially aligned rotors have electromagnetic means for clutching them together, there being a separate electromagnetically operable clutch which may be used as a means for applying a brake to one of the rotors for operating selectively upon that rotor or upon both if they are clutched together.

Background of invention

My companion application entitled Combination Clutch and Brake, application Ser. No. 667,220, filed Sept. 12, 1967, shows a device in which the engagement of a clutch between two rotors will automatically disengage a second clutch which is acting to brake one of the rotors. The instant device differs from this practice in that the second clutch or brake is separately controlled by an independent electromagnet and will operate regardless of whether the braked rotor is free from, or is clutched to, the other rotor.

Summary of the invention

A pair of coaxial rotors have a first clutch means normally disengaged and operable by a first electromagnet for the connection of said rotors. Relatively rotatable parts, one of which is connected with one of said rotors, may be connected with each other by a second clutch means having an actuator which includes a second electromagnet. It will be noted that there is no fundamental difference between a brake and a clutch. Each is a clutch in fact. The parts connected by the second clutch may be regarded as brake parts only if one of them is fixed against rotation. For the purposes of this disclosure, the parts will sometimes be referred to as brake parts but broadly it will be understood that the second electromagnet operates a second clutch to connect such parts whether or not one of them is stationary to function as a brake.

Electromagnets for actuating the first and second clutches are preferably concentric in the same radial plane. The first clutch magnet is fixed not only against rotation but against axial movement. Assuming that a braking operation is desired, the second magnet is fixed against rotation but, on the other hand, is bodily movable toward and from an armature mounted on the polar extensions carried by the clutch magnet.

Brief description of drawings

FIG. 1 is a view in diametrical section of a unitary brake and clutch organization having separate actuating magnets.

FIG. 2 is a fragmentary detail view in section on the line 2—2 of FIG. 1.

Description of preferred embodiment

For purposes of exemplification, and not by way of limitation, the driving rotor comprises a sprocket 4 and the driven rotor comprises shaft 6 or hub 32, or both. A bushing 8 on the shaft supports the driving rotor 4. An annular spring 10 is confined between driving rotor 4 and the flange 12 of bushing 8 and engages an armature 14 which has a polygonal opening 16 engaged with the correspondingly formed complementary surface 18 on the hub of sprocket 4. The spring 10 normally holds the armature 14 in retracted position against the shoulder 20 of the sprocket.

Encircling the shaft 6 and secured against rotation by a supporting bracket 22 is a first annular electromagnet 24 which has a winding 26 supplied with current by the leads 28. Rotatable within the inner pole 30 of electromagnet 24 is the hub 32 of an extension pole carrier 33 which has inner and outer poles 34 and 36, respectively, in flux circuit with poles 30 and 38 of magnet 24. Between the polar extensions 34 and 36 is a non-magnetic insert 40 of friction material which is engaged by the armature 14 when the electromagnet 24 is energized. This engagement clutches rotor 4 to rotor 6, the hub 32 being secured to rotor 6 (as by set screw 39) for rotation therewith.

Mounted on the outer periphery of the annular polar extension 36 is the annular brake armature 42. This is fixed to hub 32 and is incapable of independent axial movement. The second or brake magnet frame 44 is suspended by member or members 46 slidable on posts 48 which project at angularly spaced intervals from the bracket 22 and which support the magnet 44 for bodily axial advancing movement away from retracted position and against the bias of springs 50 with which the respective posts 48 are provided. For example, there may be three such posts, each with an arm 46 and spring 50.

When the magnet 44 is energized, its inner and outer poles 52 and 54 attract armature 42. Since the armature is incapable of axial movement, the magnet 44 advances bodily to the armature and, upon clutching engagement therewith, exerts a braking action upon the brake armature 42 and the entire hub 32. Such braking action will invariably be exerted upon driven rotor 6 or 32. In the event that the clutch magnet 24 is energized, the braking action will also be exerted on the driving rotor 4. Thus the clutch not only determines whether the driven rotor 6 will be clutched to driving rotor 4, but determines whether one or both of the rotors will be subject to the second clutching action (optionally a braking action) effected by energization of the second magnet 44 by means of the leads 58.

I claim:
1. The combination with first and second coaxial rotors, of first and second annular concentric electromagnetic windings provided with respective cores, positioning means for holding said windings and cores against rotation, the first said rotor being substantially fixed against axial movement and comprising relatively rotatable polar extensions of said first core and having an armature magnetically exposed to the core of the second winding, the core of the second winding having a mounting on said positioning means on which it is non-rotatably movable axially into clutching engagement with said armature, the second rotor having a second armature connected for rotation therewith and having means for accommodating its axial movement to and from clutching engagement with said polar extensions.

2. A combination according to claim 1 in which said positioning means comprises a fixed member to which the core of the first winding is fixedly connected, the core of the second winding having guide means reciprocable along guide axially projecting elements with which said fixed member is provided and to which guide means the core of the second winding is connected, said last mentioned core being movable bodily to and from clutching engagement with the first mentioned armature, and being provided with spring means holding it normally retracted out of engagement therewith.

3. A combination according to claim 1 in which the core of the second winding extends circumferentially about said core of the first winding, one of said core extensions being peripherally outside of the core of the first winding and having its said armature extending substantially radially across the said core of the second winding.

4. The combination with coaxial rotors, of a first clutch means for connecting said rotors, an actuating means for said first clutch means including a first electromagnet, a second clutch means including relatively rotatable parts one of which is connected with one of said rotors, and actuating means for said second clutch means and including a second electromagnet, the first electromagnet comprising fixed poles, one of said rotors comprising a polar extension carrier having annular polar extensions operatively associated with the respective electromagnet poles, the other said rotor including an armature axially movable toward and from said polar extension and connected with said other rotor for rotation therewith.

5. A combination according to claim 4 in which the second electromagnet is provided with an armature mounted on the polar extension carrier aforesaid to rotate therewith, said second electromagnet including a magnet frame normally spaced from said last mentioned armature, and means supporting said frame for bodily movement toward and from said armature.

6. The combination with coaxial rotors, of a first clutch means for connecting said rotors, an actuating means for said first clutch means including a first electromagnet, a second clutch means including relatively rotatable parts one of which is connected with one of said rotors, and actuating means for said second clutch means and including a second electromagnet, fixed supporting means having the first electromagnet mounted thereon, posts projecting from the supporting means, means slidable along the posts and upon which the second electromagnet is mounted concentrically with the first, a spring biasing said last mentioned means toward the supporting means, one of said rotors comprising a carrier having mounted thereon extensions of inner and outer poles with which the first electromagnet is provided, an armature mounted on the extension of one of the poles of the first electromagnet and positioned in normally spaced relation to the second electromagnet, said second electromagnet being movable toward said armature upon said posts against the bias of said spring, said second electromagnet and its said armature constituting said second clutch means parts and having friction surfaces engageable to brake the rotation of said carrier and the rotor on which the carrier is mounted, said first clutch means including a normally retracted armature mounted on the other rotor and in an operative proximity to said inner and outer pole extensions, means for requiring said last mentioned armature to rotate with said other rotor while permitting it to move axially thereof between advanced and retracted positions, said first clutch means further including complementary friction surfaces on said last mentioned armature and said extensions, and means biasing said last mentioned armature toward its retracted position for disengagement of said first clutch means.

References Cited

UNITED STATES PATENTS 2,853,165  9/1958  Walter et al. _____ 192—18.2
3,254,746  6/1966  Myers _____ 192—18.2 XR CARLTON R. CROYLE, *Primary Examiner.*

A. D. HERRMANN, *Assistant Examiner.*

U.S. Cl. X.R.

188—163; 192—84